United States Patent [19]
Baird

[11] Patent Number: 5,300,817
[45] Date of Patent: Apr. 5, 1994

[54] SOLAR VENTURI TURBINE

[76] Inventor: William R. Baird, 1101 Monroe St., Sturgis, Ky. 42459

[21] Appl. No.: 48,481

[22] Filed: Apr. 16, 1993

[51] Int. Cl.⁵ ............................ F03D 9/00; F03G 6/04
[52] U.S. Cl. .................................. 290/55; 60/641.12; 290/1 R; 290/44
[58] Field of Search ............... 60/641.12; 290/44, 55

[56] References Cited

U.S. PATENT DOCUMENTS

| | | | |
|---|---|---|---|
| 3,048,006 | 8/1962 | Goodman | 60/641.12 |
| 3,137,125 | 6/1964 | Kyryluk | 60/641.12 |
| 3,936,652 | 2/1976 | Levine | 290/1 R |
| 4,018,543 | 4/1977 | Carson et al. | 290/55 |
| 4,118,636 | 10/1978 | Christian | 290/54 |
| 4,224,528 | 9/1980 | Argo | 290/55 |
| 4,275,309 | 6/1981 | Lucier | 290/1 R |
| 4,359,870 | 11/1982 | Holton, Sr. | 60/641.12 |
| 4,433,544 | 2/1984 | Wells et al. | 290/55 |
| 4,452,046 | 6/1984 | Valentin | 290/55 |
| 4,935,639 | 6/1990 | Yeh | 290/55 |

FOREIGN PATENT DOCUMENTS

| | | | |
|---|---|---|---|
| 164912 | 4/1954 | Australia | 60/641.12 |
| 129274 | 8/1982 | Japan | 60/641.12 |

*Primary Examiner*—A. D. Pellinen
*Assistant Examiner*—Robert Lloyd Hoover

*Attorney, Agent, or Firm*—Wood, Herron & Evans

[57] ABSTRACT

A solar venturi turbine includes an upwardly oriented venturi tube supported by a venturi support skirt. The venturi tube includes a tapered thermopane glass enclosure which allows sunlight to project therethrough and impinge on a tapered centrifugal fan fronting the thermopane enclosure and mounted within the venturi tube. Located above the centrifugal fan in the neck of the venturi tube is a high velocity fan. A high pressure compressor is mounted above the high velocity fan, and finally a turbine is mounted above the high pressure compressor. A venturi tube outlet flares outwardly directly above the turbine and is mounted to the venturi tube. The turbine is connected to a shaft to drive an electrical generator thereby producing electricity. The sun's rays heat the air within the thermopane glass enclosure causing the reduced density air to rise within the venturi tube and propel the centrifugal fan. The air continues upwardly through the high speed fan and the high pressure compressor increasing in velocity and finally passing through and turning the turbine which is connected to the generator by the turbine shaft. Initial start-up of the solar venturi turbine is with a motor which turns both fans and the high pressure compressor. The solar venturi turbine provides a clean and environmentally harm-free source of electricity without diminishing fossil fuel reserves.

19 Claims, 5 Drawing Sheets

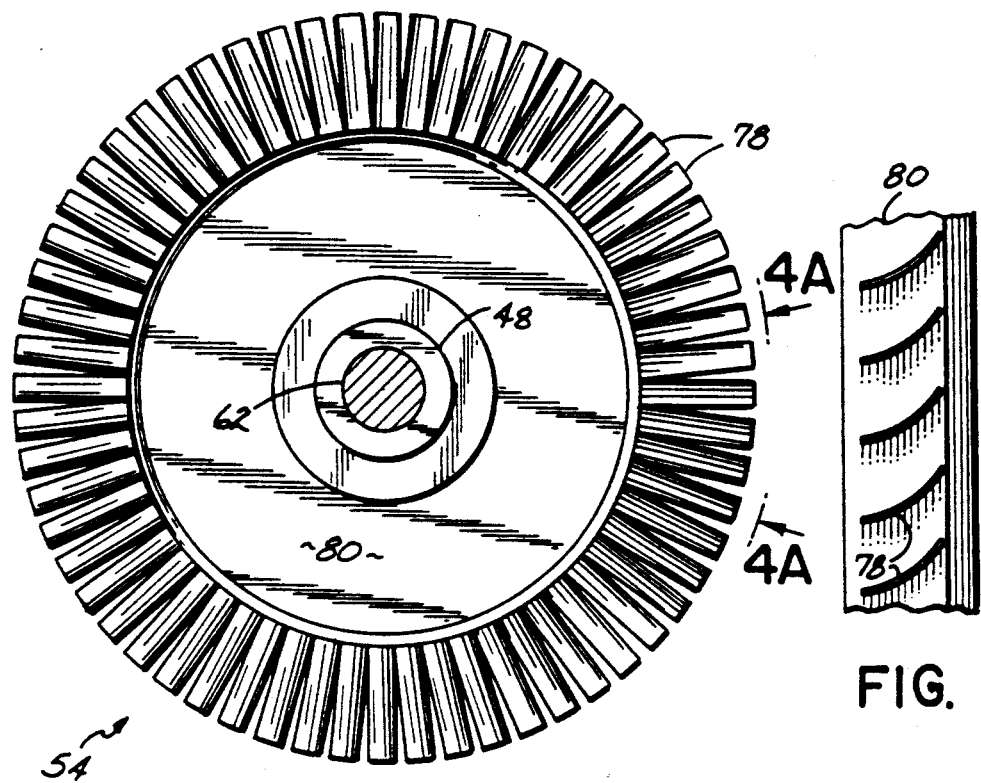
FIG. 4
FIG. 4A
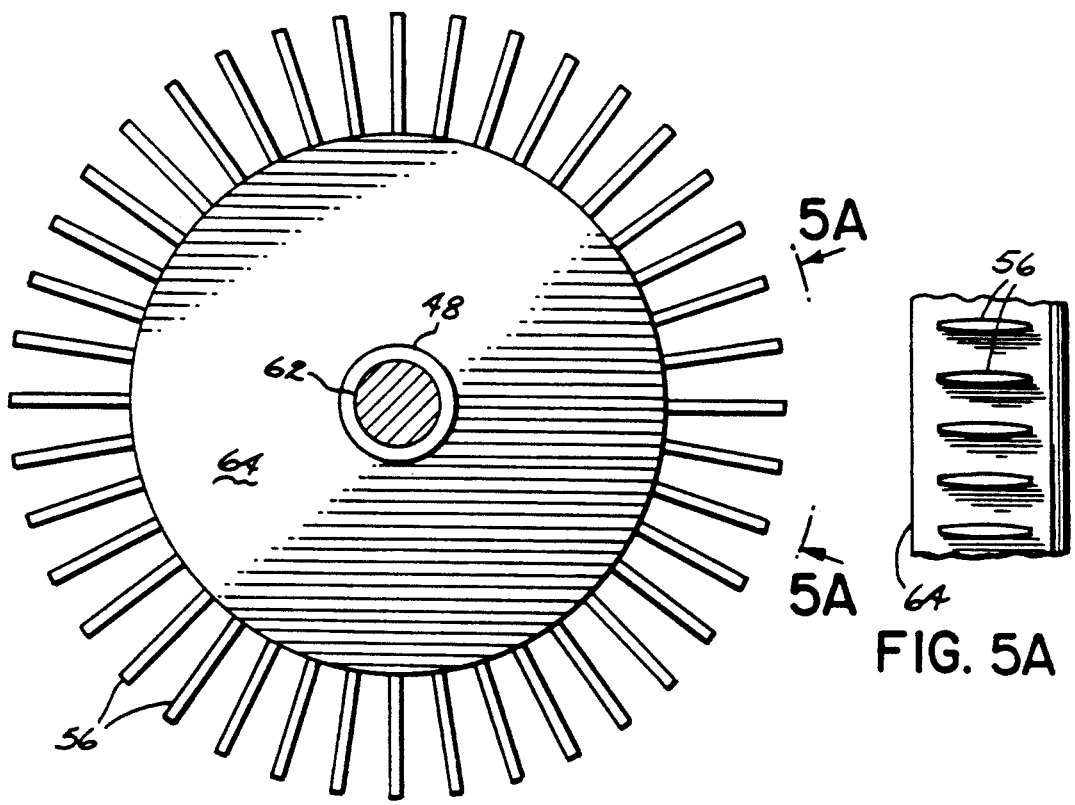
FIG. 5
FIG. 5A

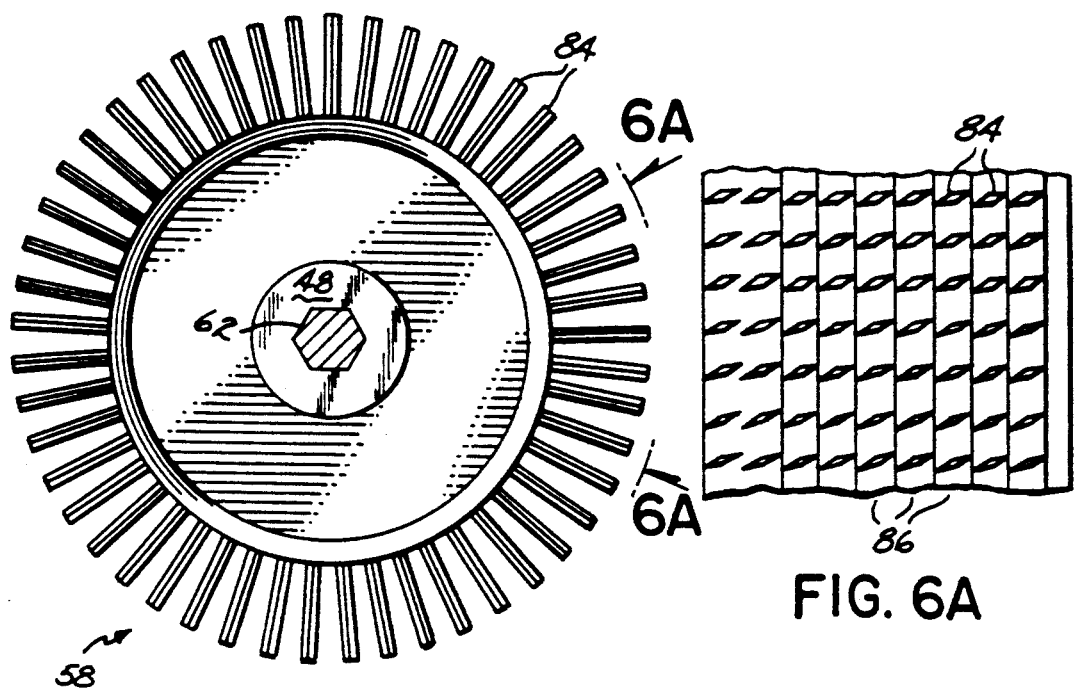
FIG. 6
FIG. 6A
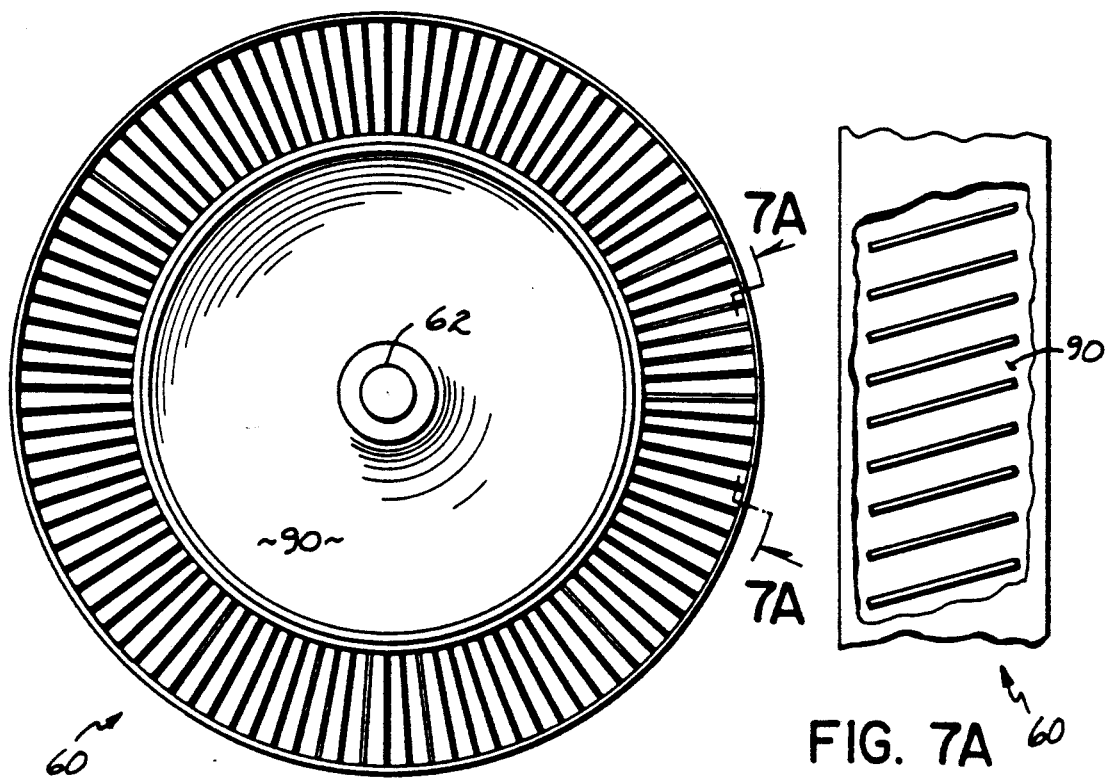
FIG. 7
FIG. 7A

SOLAR VENTURI TURBINE

BACKGROUND OF THE INVENTION

This invention relates to an apparatus for generating electrical energy. More particularly, the present invention is directed to a solar energy harnessing device which is particularly adapted for use in combination with a generator to supply electricity.

As a result of the increasing costs and decreasing availability of conventional fossil fuels, there is an expanding need for an alternative to the combustion of fossil fuels for the generation of useful power. Options include atomic and hydroelectric installations. However, both atomic and hydroelectric installations have proven to be lacking as commercially viable alternatives to the production of electricity. Furthermore, such installations are practically limited by their potential detrimental affects upon the environment.

A number of approaches have been developed for utilizing the sun's radiation to produce useful energy. Solar energy can provide mechanical power to generate electricity without polluting the air and water, or draining valuable and limited fossil fuel reserves. One method of using solar energy to produce electricity involves the creation of an upward flow of air in a confined conduit. The upward flow of air rotates a turbine to provide torque capable of driving an electrical generator.

The upward flow of air in such systems is generated by allowing the sun's radiation to heat a volume of air in a substantially confined system. The heated air convectively rises relative to the colder ambient air resulting from the heating process. These thermally induced updrafts or air currents are then harnessed by a wind turbine. The turbine is geared to and drives a generator for the production of electricity. However, in known solar energy systems utilizing the thermally induced updrafts of air the practical applicability of such systems has proven to be very limited. Principally this is due to the specific structures and features utilized in many of the prior art systems which are not well adapted or designed for efficient, reliable, and economical power generation.

Therefore, a need exists for a new improved solar energy apparatus for the production of electricity which is both pollution free and cost effective.

SUMMARY OF THE INVENTION

It has been an objective of the present invention to provide a pollution and emission free source of cost effective power for the generation of electricity.

It has been a further objective to provide a solar energy power plant which is operable in a wide variety of climates throughout the world and can be adapted to existing electrical power supply circuits and does not require a significant amount of maintenance.

Still another objective of the present invention is to provide a solar energy powered electricity generated plant which can function as a stand alone unit and can be sized to accommodate a wide range of electrical power requirements.

These objectives of the invention are obtained by a solar venturi turbine electrical power plant. The solar venturi turbine includes an upwardly oriented venturi tube which has a large bottom neck opening and a small upper neck opening. The venturi tube is supported on the ground by a skirt which allows ambient air to be drawn inwardly to the venturi tube bottom opening.

The venturi tube of the present invention has a sloped thermopane glass panel which joins the upper neck of the venturi tube to the lower neck. The present invention includes a centrifugal fan having a plurality of vanes. The centrifugal fan is tapered to have a small diameter at a top end corresponding to the upper neck of the venturi tube and a larger diameter at a bottom end corresponding to the lower neck of the venturi tube. The centrifugal fan fronts to the thermopane glass panels of the venturi tube and defines a volume of air therebetween. The centrifugal fan includes a thermally absorbent coating which aids in heating the volume of air trapped between the thermopane glass panels and the centrifugal fan by the irradiating sunlight.

Positioned above the centrifugal fan in the upper neck of the venturi tube is a high velocity fan. A high pressure compressor is mounted above the high velocity fan, and finally a turbine is mounted above the high pressure compressor. An outwardly tapered venturi outlet is connected to the upper neck of the venturi tube above the turbine. The turbine is geared to a shaft which drives an electrical generator positioned at the base of the venturi tube below its lower neck portion in the present invention.

In operation, the sun's rays heat the volume of air within the thermoplane glass enclosure fronted by the centrifugal fan vanes. The heated volume of air rises upward toward the upper neck portion of the venturi tube thereby creating an updraft of air. The updraft of air propels the rotation of the centrifugal fan. The heated air between the thermopane glass panels and the centrifugal fan is replaced by ambient air which is drawn in through the support skirt of the solar venturi turbine and cooler and more dense than the heated air it replaces.

As the updraft of air current is forced through the narrowing venturi tube it increases in velocity. The rising current of air is forced upwardly by the blades of the high velocity fan positioned within the narrow neck of the venturi tube. The velocity of air current continues to increase after passing through the high velocity fan and is channeled into the high pressure compressor by a series of guide vanes positioned within the upper neck of the venturi tube. The high pressure compressor further increases the velocity of the flow of hot air and forces the air to turn the turbine positioned immediately above the high pressure compressor. The rising updraft of high velocity air turns the turbine which is geared to a shaft extending back down through the venturi tube to an electrical generator on the ground within the skirt support of the present invention.

The solar venturi turbine of the present invention efficiently produces electrical power by transforming solar energy into the rotational energy required to drive the armature of the generator in an environmentally safe manner. Additionally, the initial start-up of the solar venturi turbine of the present invention can be accomplished by providing an electrical start-up motor which is geared to the centrifugal fan, the high velocity fan, and the high pressure compressor. The electrical motor acts as an auxiliary means for providing the initial start-up energy required for the centrifugal fan, the high velocity fan and the high pressure compressor. In addition, to maintain the rotational dynamics required for the generation of electricity after initial start up, a fly wheel may be mounted on the backside of the centrifugal fan according to the present invention. The fly wheel serves to store the rotational kinetic energy generated by the updraft of hot air propelling the centrifugal fan and maintain its rotation through periods of low sunlight activity.

BRIEF DESCRIPTION OF THE DRAWINGS

The objectives and features of the present invention will become more readily apparent from the following detailed description taken in conjunction with the accompanying drawings in which:

FIG. 4 is a cross-sectional view of a high velocity fan of the present invention taken along line 4—4 of FIG. 2;

FIG. 4A is a partial side elevational view between line 4a—4a of the high velocity fan of FIG. 4;

FIG. 5 is a cross-sectional view of a plurality of guide vanes of the present invention taken along line 5—5 of FIG. 2;

FIG. 5A is a partial side elevational view taken between line 5a—5a of the guide vanes of FIG. 5;

FIG. 6 is a cross-sectional view of a high pressure compressor of the present invention taken along line 6—6 of FIG. 2;

FIG. 6A is a partial side elevational view taken along line 6a—6a of the high pressure compressor of FIG. 6;

FIG. 7 is a cross-sectionial view of a turbine of the present invention taken along line 7—7 of FIG. 2; and FIG. 7A is a partial side elevational view taken along line 7a—7a of the turbine of FIG. 7.

DETAILED DESCRIPTION OF THE INVENTION

Figure 1:
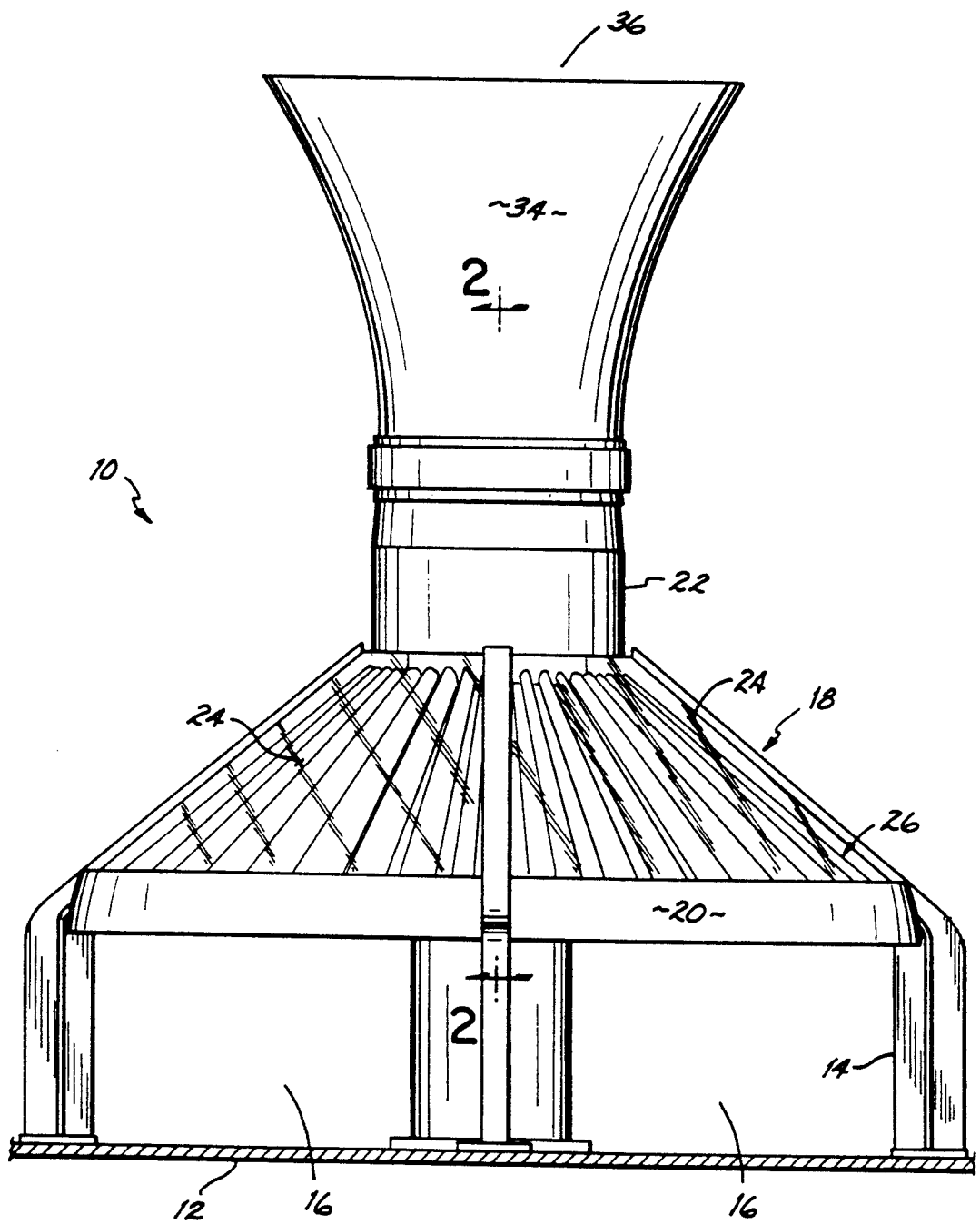
FIG. 1 is a side elevational view of the solar venturi turbine of the present invention.

Referring to FIG. 1, a solar venturi turbine 10 according to the present invention is shown. The solar venturi turbine 10 is positioned on the ground 12 or other suitable surface and supported by a skirt 14 having openings 16 through which ambient air may be drawn into the solar venturi turbine 10. Supported atop the skirt support 14 is a venturi tube 18 having at its lower end a large diameter neck 20 and at its upper end a narrow diameter neck 22. A number of thermopane glass panels 24 are provided on a tapered region of the venturi tube 18. In the preferred embodiment of the present invention, the thermopane glass panels 24 are tapered on approximately a 45° angle between the upper neck 22 and the lower neck 20 of the venturi tube. Immediately behind and fronting the thermopane glass panels 24 of the present invention is a tapered centrifugal fan 26 having a plurality of fan vanes 28. The centrifugal fan 26 is likewise tapered at an approximate 45° angle having a narrow diameter upper region 30 and a larger diameter lower region 32.

Extending upwardly from the narrow upper neck 22 of the venturi tube 18 is an outwardly flared venturi outlet 34. The venturi outlet 34 has an uppermost opening 36 which allows the air exiting the solar venturi turbine 10 of the present invention to return to the atmosphere.

Figure 2:
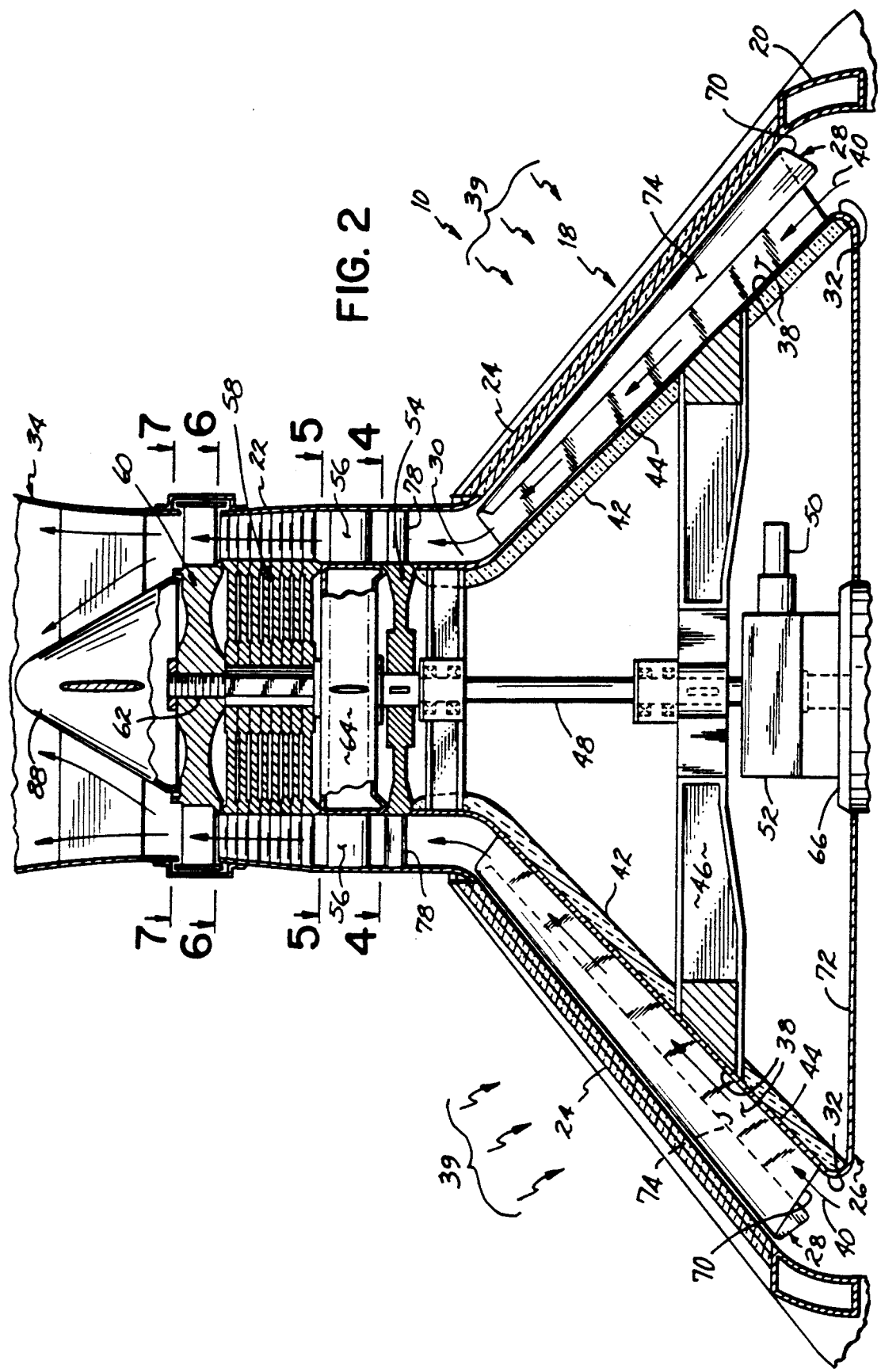
FIG. 2 is an enlarged cross-sectional view of the solar venturi turbine taken along line 2—2 of FIG. 1.

FIG. 2 shows the internal components of the solar venturi turbine 10 of the present invention including the tapered centrifugal fan 26 with the fan vanes 28 which front the thermopane glass panels 24. The fan vanes 28 and centrifugal fan 26 have a thermally absorbent black coating or layer 38 which enhances the heating of a volume of air 40 between the thermopane glass panels 24 and the centrifugal fan 26. To further increase the thermal effect of sunlight 39 which impinges upon the centrifugal fan 26 through the thermopane glass panels 24, a layer of insulation 42 is provided on a backside 44 of the centrifugal fan 26.

Also attached to the back 44 of the centrifugal fan 26 is a rotational fly wheel 46 used for storing rotational kinetic energy generated by the centrifugal fan 26. The fly wheel 46 and centrifugal fan 26 are mounted on a central drive shaft 48 extending generally vertically within the solar venturi turbine 10 of the present invention. The centrifugal fan 26 and the fly wheel 46 rotate on the axis of the drive shaft 48 during normal operation.

To assist in the start-up of the solar venturi turbine 10 and initiate the rotation of the centrifugal fan 26, a motor 50 is provided within the venturi tube 18 of the present invention and meshed with the drive shaft 48 through a gear box 52. In the preferred embodiment of the present invention, the rotation of the centrifugal fan 26 and the fly wheel 46 is counterclockwise.

Positioned above the centrifugal fan 26 and in the narrow neck of the venturi tube 18 is a high velocity fan 54. The high velocity fan 54 increases the velocity of the upwardly moving volume of air 40 and is also geared to the drive shaft 48 via gear box 64 to benefit from the start-up motor 50 upon the initial operation of the solar venturi turbine 10. As the volume of air 40 vents upwardly through the venturi tube 18 it is directed by a plurality of guide vanes 56 positioned just above the high velocity fan 54 in the upper neck 22. The guide vanes 56 serve to direct and focus the upwardly moving current of air 40 into a high pressure compressor 58 also located in the upper neck 22 of the venturi tube 18. The high pressure compressor 58 is also geared to the drive shaft 48 via gear box 64 to benefit from the start-up motor 50 for initial operation.

Positioned immediately above the high pressure compressor 58 in the narrow neck 22 of the venturi tube 18 is a turbine 60. In response to the updraft volume of air 40 generated in the upper neck 22 of the venturi tube 18, the turbine 60 rotates and is geared to a turbine shaft 62 connecting the turbine 60 to an electrical generator 66 via gear box 52 positioned below the turbine 60 within the support skirt 14 in the preferred embodiment of the present invention.

The outwardly flared upwardly directed venturi outlet 34 is attached to the narrow neck 22 of the venturi tube 18 adjacent the turbine 60. As the air is drawn into the solar venturi turbine 10 through the support skirt 14 and large diameter lower neck 20 of the venturi tube 18 it increases in velocity upon passing through the venturi tube narrow upper neck 22 to exit through the large outwardly flared venturi outlet 34.

In the operation of the solar venturi turbine 10 of the present invention, the initial start-up is accomplished by the motor 50 which is geared to the centrifugal fan 26 via gear box 52, and to high velocity fan 54 and the high pressure compressor 58 by the drive shaft 48 and gear box 64. Once the motor 50 initiates the counterclockwise rotation of the centrifugal fan 26, the high velocity fan 54, and high pressure compressor 58, the solar venturi turbine 10 of the present invention is designed to generate electrical power in a self-sustaining fashion. Sunlight 39 projects through the thermopane glass panels 24 on the taper of the venturi tube 18 and upon the thermal absorbent coating 38 of the centrifugal fan 26 fronting the thermopane glass panels 24 in the preferred embodiment of the present invention. Air trapped between the panels 24 and coating 38 is heated, thereby causing the air to rise further driving centrifugal fan 26.

Figure 3:
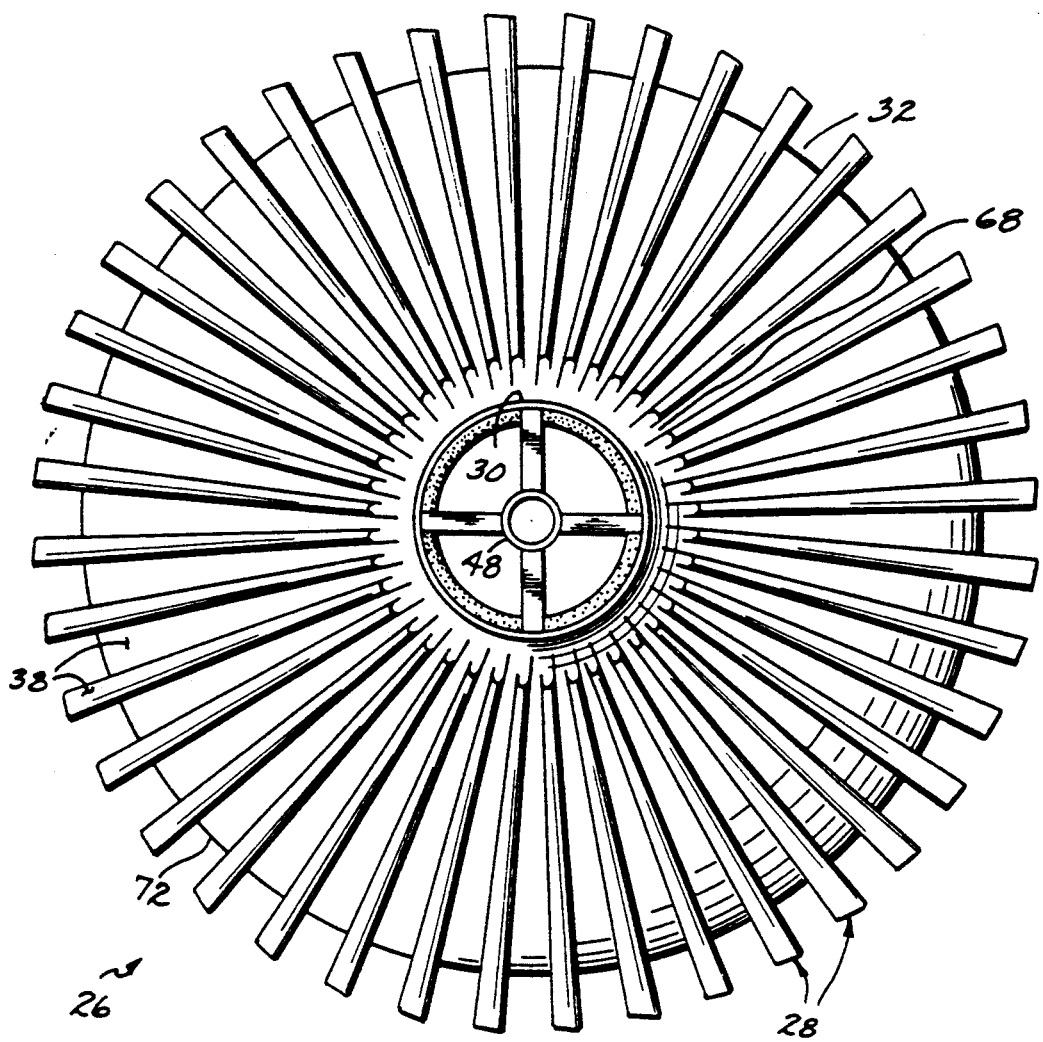
FIG. 3 is a top elevational view of a centrifugal fan of the present invention.
Figure 3A:
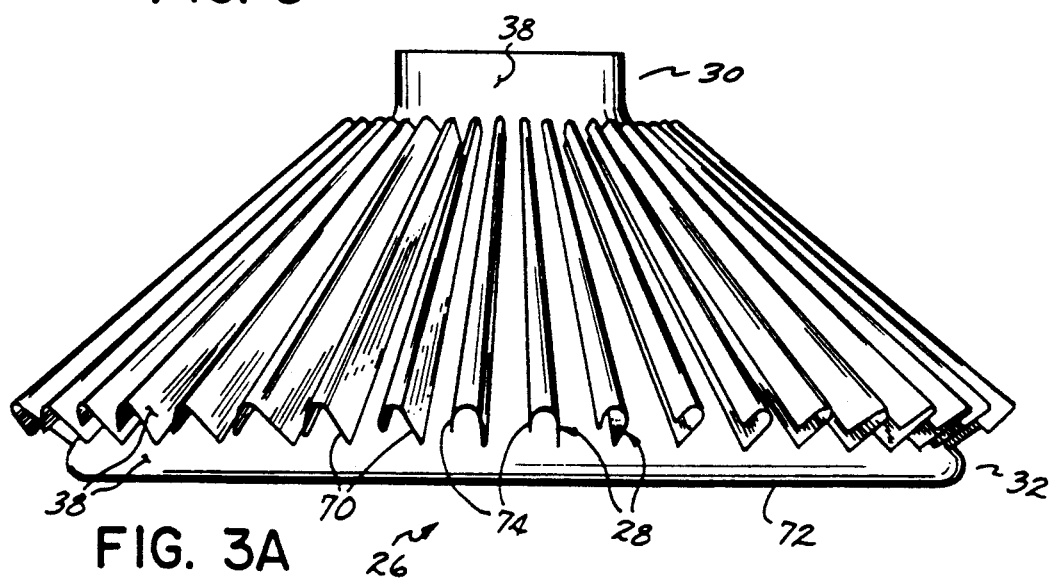
FIG. 3A is a side elevational view of the centrifugal fan of FIG. 3.

The centrifugal fan 26 is as shown in FIGS. 3 and 3A with the plurality of generally J-shaped fan vanes 28 which are oriented radially outward from a center 68 of the fan. A longer leg 70 of each J-shaped fan vane 28 is attached to a centrifugal fan housing 72. A hook portion 74 of each fan vane 28 is downwardly oriented toward and spaced from the surface of the centrifugal fan housing 72. Each fan vane 28 is designed such that the hook portion 74 is more narrow toward the center upper region 68 of the centrifugal fan relative to a perimeter lower region 32 of the centrifugal fan 26. This design assists in the rotation of the centrifugal fan 26 in that the upwardly moving air 40 flows within each fan vane hook portion 74 and the geometry of each fan vane 28 thereby assists in the counterclockwise rotation of the centrifugal fan 26. The area within each fan vane 28 decreases upwardly thereby increasing the rotational energy delivered by the updraft of air 40 in the upper region 68 of the centrifugal fan 26.

As the air 40 is heated and is advanced upwardly through the tapered centrifugal fan 26, it enters the narrow neck 22 of the venturi tube 18 and encounters the high velocity fan 54 shown in FIGS. 4 and 4A. Like the centrifugal fan 26, the high velocity fan 54 rotates counterclockwise in the preferred embodiment of the present invention and increases the velocity of the updrafted air 40 passing through. The high velocity fan 54 has a plurality of radially extending fan blades 78 which have a scalloped shaped profile and are mounted on a housing 80. The rotation of the scalloped shaped fan blades 78 serves to further increase the velocity of the updraft of air 40 passing through the narrow neck 22 of the venturi tube 18.

The updraft of air 40 exiting the high velocity fan 54 of the present invention encounters the radially extending guide vanes 56 shown in FIGS. 5 and 5A. These non-rotating guide vanes are secured on the gear box 64 and serve to direct and focus the upwardly moving air 40. The guide vanes 56 channel the air 40 into the high pressure compressor 58 located immediately thereabove and shown in FIGS. 6 and 6A. The high pressure compressor 58 has a plurality of radially extending compressor tines 84 which are arranged in a plurality of layers 86 as shown in FIG. 6A. The high pressure compressor 58 further increases the velocity of the flow of warm air 40 passing therethrough.

FIGS. 3-6 show the drive shaft 48 connecting the centrifugal fan 26, the high velocity fan 54, and the high pressure compressor 58. The drive shaft 48 is meshed to the gear box 52 adjacent the start-up motor 50 as shown in FIG. 2. The fly wheel 46 which backs the centrifugal fan 26 is also geared to the drive shaft 48 to provide rotational kinetic energy to the solar venturi turbine 10 once rotation of the drive shaft 48 and centrifugal fan 26 is established.

The updraft of air 40 exiting the high pressure compressor 58 passes through and turns the turbine 60 located in the upper neck 22 of the venturi tube 18 and shown in FIGS. 7 and 7A. Once the upwardly moving air 40 exits the turbine 60 it is directed around a turbine cone 88 mounted upon a turbine housing 90 and into the outwardly flared venturi outlet 34 and is returned to the atmosphere.

The turbine 60 which rotates in response to the updraft of air 40 drives the turbine shaft 62 concentric with the drive shaft 48. The turbine shaft 62 is meshed with the gear box 52. The turbine shaft 62 drives the electrical generator 66 at the desired RPM to produce a 60 cycle current output from the electrical generator 60. Once the solar venturi turbine 10 is to be shut down, at sunset for example, the generator 66 can be taken off line and the solar venturi turbine 10 will gradually shut itself down.

The solar venturi turbine 10 of the present invention provides an efficient and environmentally harmfree production of electricity by converting the thermal energy of the sun's rays into electricity. Furthermore, once operational the solar venturi turbine 10 will require a minimal amount of maintenance and does not require the use of fossil fuels or other diminishing energy supplies. The solar venturi turbine 10 can function in a stand-alone capacity in any desired climate without being enclosed in a building or infrastructure. Additionally, the spatial dimensions of the solar venturi turbine 10 can be adjusted and sized to accommodate a wide range of kilowatt requirements. Alternatively, the solar venturi turbine 10 as a source of energy can be coupled with machines other than the electrical generator 66 such as a line shaft, a mill, or other power requiring apparatus depending upon the specific application.

From the above disclosure of the general principles of the present invention and the preceding detailed description of the preferred embodiment, those skilled in the art will readily comprehend the various modifications to which the present invention is susceptible. Therefore, I desire to be limited only by the scope of the following claims.

I claim:

1. A solar venturi turbine for generating electrical power from sunlight comprising:

an upwardly oriented venturi tube having a sloped thermopane glass surface extending between a larger lower neck and a smaller upper neck of said venturi tube;

a tapered centrifugal fan mounted within said venturi tube adjacent said thermopane glass surface and having a plurality of fan vanes being covered with a thermal absorbent coating, said thermopane glass surface being spaced from said centrifugal fan to define a volume of air being heated by the sunlight projecting through said thermopane glass surface and impinging upon said thermal absorbent coating, said volume of air rising toward said venturi tube upper neck due to said heating thereby rotating said centrifugal fan;

a high velocity fan positioned within said venturi tube upper neck and having a plurality of high velocity fan blades mounted on a rotatable fan shaft, said fan blades rotating in response to and increasing the velocity of said rising volume of air;

a high pressure compressor positioned above said high velocity fan in said venturi tube upper neck, said rising volume of air further increasing in velocity upon passing through said high pressure compressor;

a turbine positioned above said high pressure compressor in said venturi tube upper neck and having a turbine wheel rotatable in response to said rising volume of air;

an electrical generator; and means for driving said electrical generator from the rotation of said turbine wheel to enable said electrical generator to produce electricity in response to said driving means.

2. The solar venturi turbine of claim 1 further comprising:

an outwardly tapered venturi outlet connected to said venturi tube upper neck above said turbine.

3. The solar venturi turbine of claim 1 wherein each said centrifugal fan vane has a cross-sectional profile approximating an inverted J-shaped hook having a longer leg of each said J-shaped hook mounted to said rotatable centrifugal fan.

4. The solar venturi turbine of claim 1 further comprising:

means for starting the rotation of said centrifugal fan, said high velocity fan, and said high pressure compressor upon initial operation of the solar venturi turbine.

5. The solar venturi turbine of claim 4 wherein said starting means comprises a motor being geared to said centrifugal fan.

6. The solar venturi turbine of claim 1 further comprising:

means for storing rotational kinetic energy being generated in response to the rising volume of air.

7. The solar venturi turbine of claim 6 wherein said storing means comprises a generally horizontally mounted flywheel positioned between said upper neck and said lower neck of said venturi tube and mounted to said centrifugal fan.

8. The solar venturi turbine of claim 1 further comprising:

an insulation layer affixed to a back side of said thermal absorbent coating on said centrifugal fan.

9. The solar venturi turbine of claim 1 further comprising:

a plurality of guide vanes positioned within said venturi tube upper neck for directing the rising volume of air through said venturi tube upper neck and into said high pressure compressor.

10. A solar venturi turbine for generating electrical power from sunlight comprising:

an upwardly oriented venturi tube having a sloped thermopane glass surface extending between a larger lower neck and a smaller upper neck of said venturi tube;

a solar energy thermal absorbent surface spaced from said thermopane glass surface to define a volume of air, said volume of air being heated by the sunlight projecting through said thermopane glass surface and impinging upon said thermal absorbent surface, said volume of air rising toward said venturi tube upper neck due to said heating;

a high velocity fan positioned within said venturi tube upper neck and having a plurality of high velocity fan blades mounted on a rotatable fan shaft, said fan blades rotating in response to and increasing the velocity of said rising volume of air;

a high pressure compressor positioned above said high velocity fan in said venturi tube upper neck, said rising volume of air further increasing in velocity upon passing through said high pressure compressor;

a turbine positioned above said high pressure compressor in said venturi tube upper neck and having a turbine wheel rotatable in response to said rising volume of air;

an electrical generator; and means for driving said electrical generator from the rotation of said turbine wheel to enable said electrical generator to produce electricity in response to said driving means.

11. The solar venturi turbine of claim 10 further comprising:

a tapered centrifugal fan mounted within said volume of air enclosed by said thermopane glass surface and having a plurality of centrifugal fan vanes mounted upon said thermal absorbent surface being rotatable in response to said rising volume of air.

12. The solar venturi turbine of claim 11 wherein each said centrifugal fan vane has a cross-sectional profile approximating an inverted i-shaped hook having a longer leg of each said J-shaped hook mounted to said rotatable centrifugal fan.

13. The solar venturi turbine of claim 12 further comprising:

means for starting the rotation of said centrifugal fan, said high velocity fan, and said high pressure compressor upon initial operation of the solar venturi turbine.

14. The solar venturi turbine of claim 13 wherein said starting means comprises a motor being geared to said centrifugal fan.

15. The solar venturi turbine of claim 10 further comprising:

means for storing rotational kinetic energy being generated in response to the rising volume of air.

16. The solar venturi turbine of claim 15 wherein said storing means comprises a generally horizontally mounted flywheel positioned between said upper neck and said lower neck of said venturi tube and mounted to said centrifugal fan.

17. The solar venturi turbine of claim 10 further comprising:

an insulation layer affixed to a back side of said thermal absorbent coating on said centrifugal fan.

18. The solar venturi turbine of claim 10 further comprising:

a plurality of guide vanes positioned within said venturi tube upper neck for directing the rising volume of air through said venturi tube upper neck and into said high pressure compressor.

19. The solar venturi turbine of claim 10 further comprising:

an outwardly tapered venturi outlet connected to said venturi tube upper neck above said turbine.

* * * * *

UNITED STATES PATENT AND TRADEMARK OFFICE
CERTIFICATE OF CORRECTION

PATENT NO. : 5,300,817
DATED : April 5, 1994
INVENTOR(S) : William R. Baird

It is certified that error appears in the above-identified patent and that said Letters Patent is hereby corrected as shown below:

Column 8, line 26, Claim 12, "i-shaped" should be -- J-shaped --.

Signed and Sealed this

Eighteenth Day of October, 1994

BRUCE LEHMAN

Attest:

Attesting Officer

Commissioner of Patents and Trademarks